Sept. 28, 1948.                P. D. HUDSON                2,450,281
                    POWER LIFT MATERIAL WEIGHING MACHINE
Filed March 13, 1946                              3 Sheets-Sheet 1

Inventor
P. D. Hudson
By Wilfred E. Lawson
Attorney

Sept. 28, 1948.    P. D. HUDSON    2,450,281
POWER LIFT MATERIAL WEIGHING MACHINE
Filed March 13, 1946    3 Sheets-Sheet 2
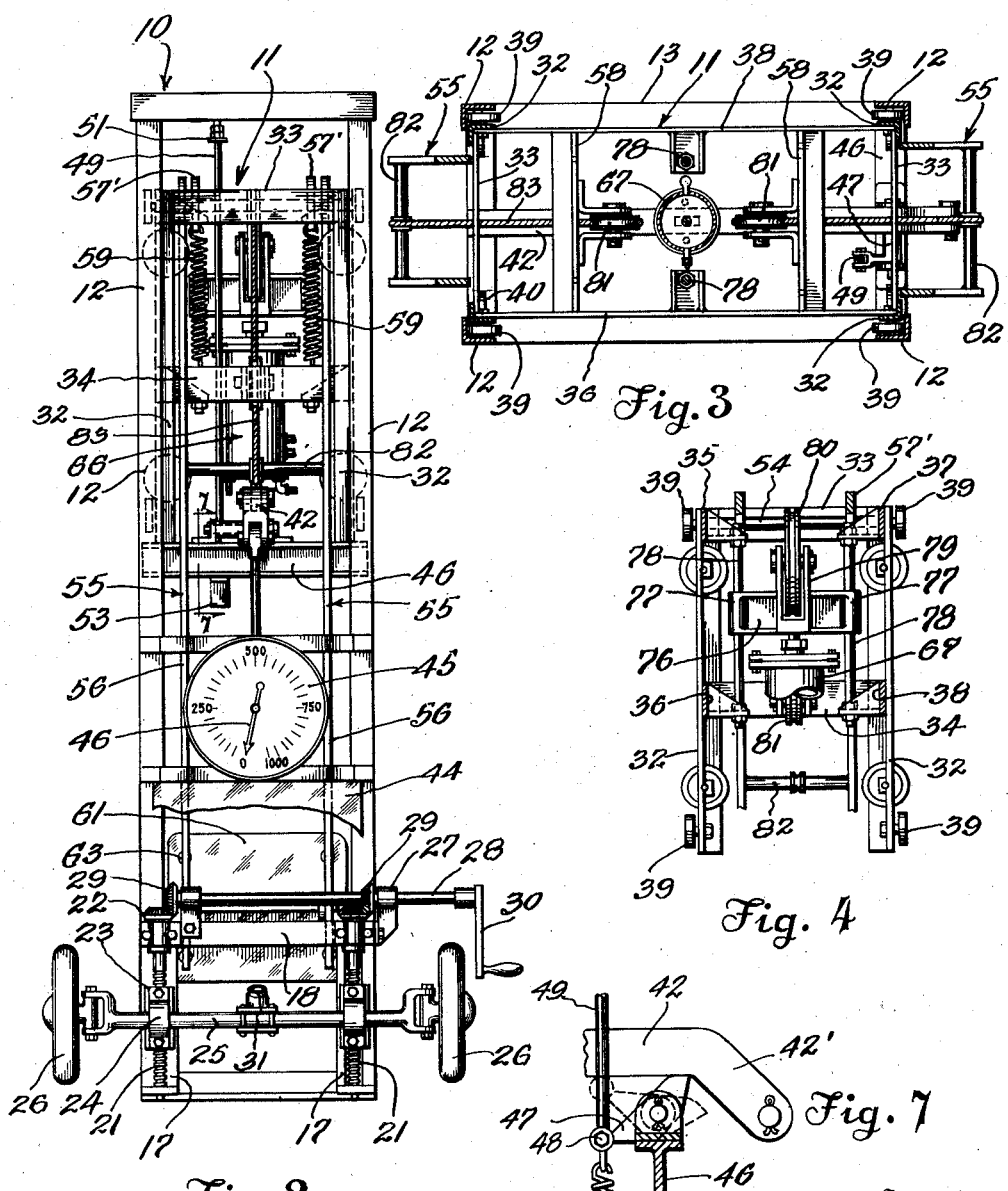
Inventor
P. D. Hudson
By Wilfred E. Lawson
Attorney Sept. 28, 1948.    P. D. HUDSON    2,450,281
POWER LIFT MATERIAL WEIGHING MACHINE
Filed March 13, 1946    3 Sheets-Sheet 3
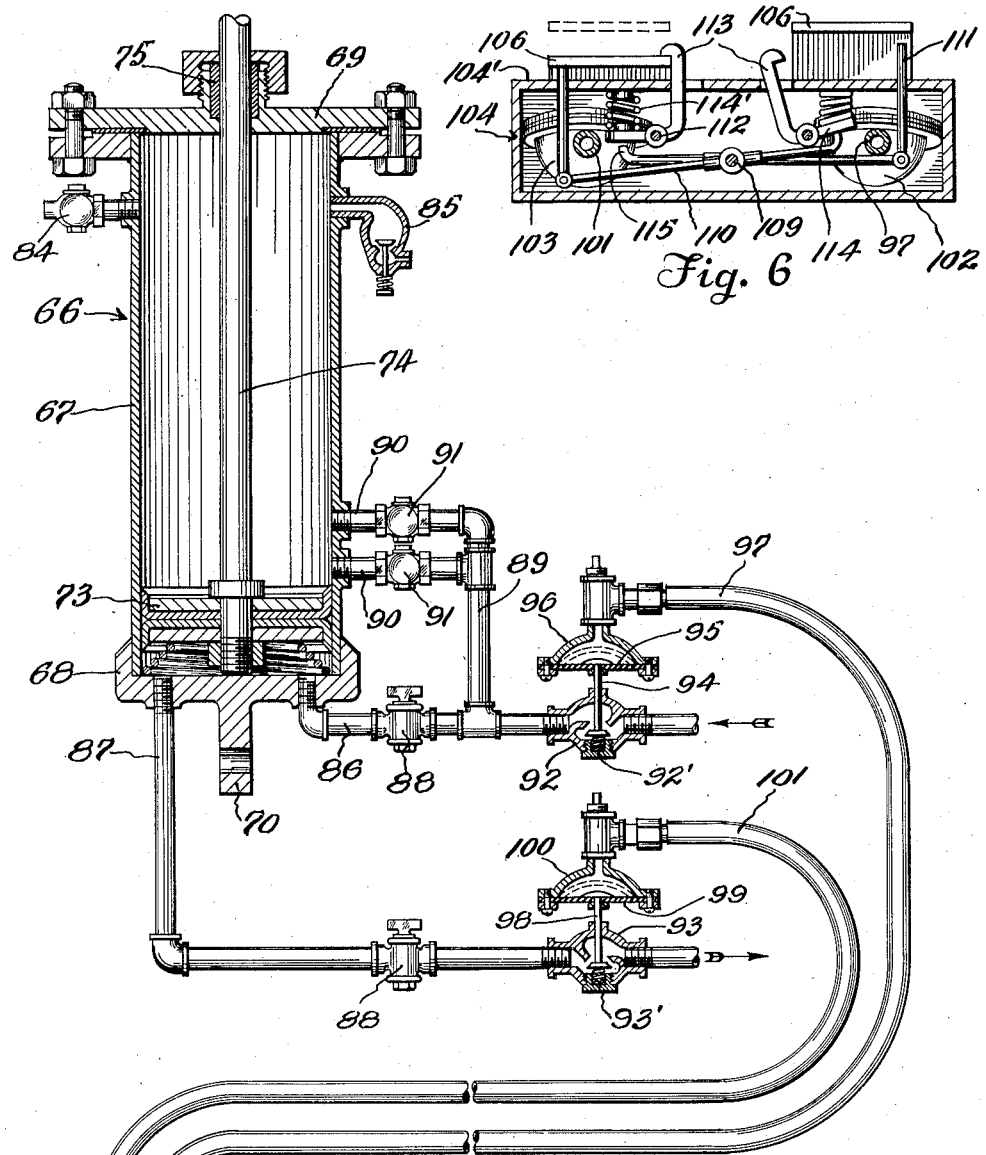
Fig. 6
Fig. 5
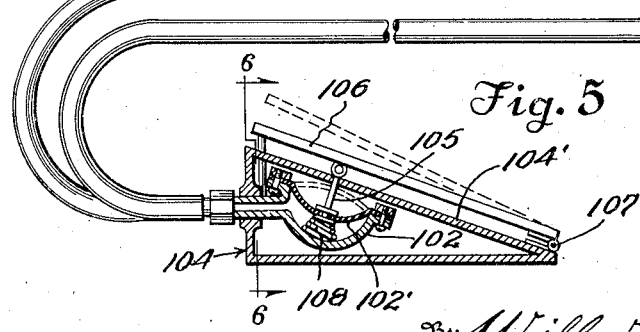
Inventor
P. D. Hudson
By Wilfred E. Lawson
Attorney Patented Sept. 28, 1948

2,450,281

UNITED STATES PATENT OFFICE 2,450,281

POWER LIFT MATERIAL WEIGHING MACHINE

Perry D. Hudson, Corpus Christi, Tex.

Application March 13, 1946, Serial No. 654,073

12 Claims. (Cl. 265—52)

1

This invention relates generally to the class of weighers and is directed particularly to improvements in machines for picking up and weighing bodies of material such, for example, as bales of cotton and the like.

It is an object of the present invention to provide a machine which will take hold of, lift and weigh a body, such as a bale of cotton or the like, entirely automatically and return the bale or body to its initial position at the completion of the weighing operation, thereby providing a means whereby bales of material may be progressively moved into a predetermined position on hand trucks or in any other suitable manner, picked up, weighed and replaced upon the hand trucks without involving any manual effort.

Another object of the invention is to provide a machine of the above described character wherein a novel mechanism is employed which, upon picking up the body to be weighed, from its supporting surface, automatically transmits the entire weight of the body to the scale beam whereby the weight is indicated upon a suitable indicating mechanism.

Still another object of the invention is to provide a machine of the character stated wherein pneumatically operated gripping and lifting elements are supported upon a scale beam in a novel manner whereby the weight of the lifted body is at once transmitted to the scale beam to be indicated upon a recording dial as soon as the lifting elements take hold of and raise the load to a predetermined extent.

A still further object of the invention is to provide a mechanism of the above described character wherein the scale beam is maintained against oscillation until the load has been raised to the stated predetermined extent whereupon a releasing mechanism is actuated to permit the scale beam to move under the weight of the lifted body in order to register or indicate the weight of such body upon an indicating mechanism.

Still another object of the invention is to provide an automatic body weighing machine of the character stated wherein a novel control mechanism is provided for effecting the raising and lowering of the body so that a single operator in charge of the machine can occupy a fixed position while bodies are being brought up, weighed and removed, and control the operation of the weighing mechanism and also observe the weights of the different bodies as the mechanism functions.

Many other objects and advantages of the invention will become apparent as the description of the same proceeds and the invention will be

2 best understood from a consideration of the following detailed description taken in connection with the accompanying drawings forming a part of the specification, with the understanding, however, that the invention is not confined to a strict conformity with the showing of the drawings but may be changed or modified so long as such changes or modifications mark no material departure from the salient features of the invention as expressed in the appended claims.

In the drawings:

Figure 2 is a view in elevation of the side of the machine upon which the scale mechanism is located.

Figure 3 is a horizontal section taken substantially on the line 3—3 of Figure 1, looking downwardly.

Figure 4 is a vertical section taken substantially on the line 4—4 of Figure 1, looking in the direction of the arrows.

Figure 5 is a view illustrating more or less diagrammatically the fluid control system by which the weighing mechanism is operated.

Figure 6 is a sectional view taken transversely of the foot control unit, substantially on the line 6—6 of Figure 5.

Figure 7 is a detail section taken on line 7—7 of Figure 2.

Figures 1, 8:
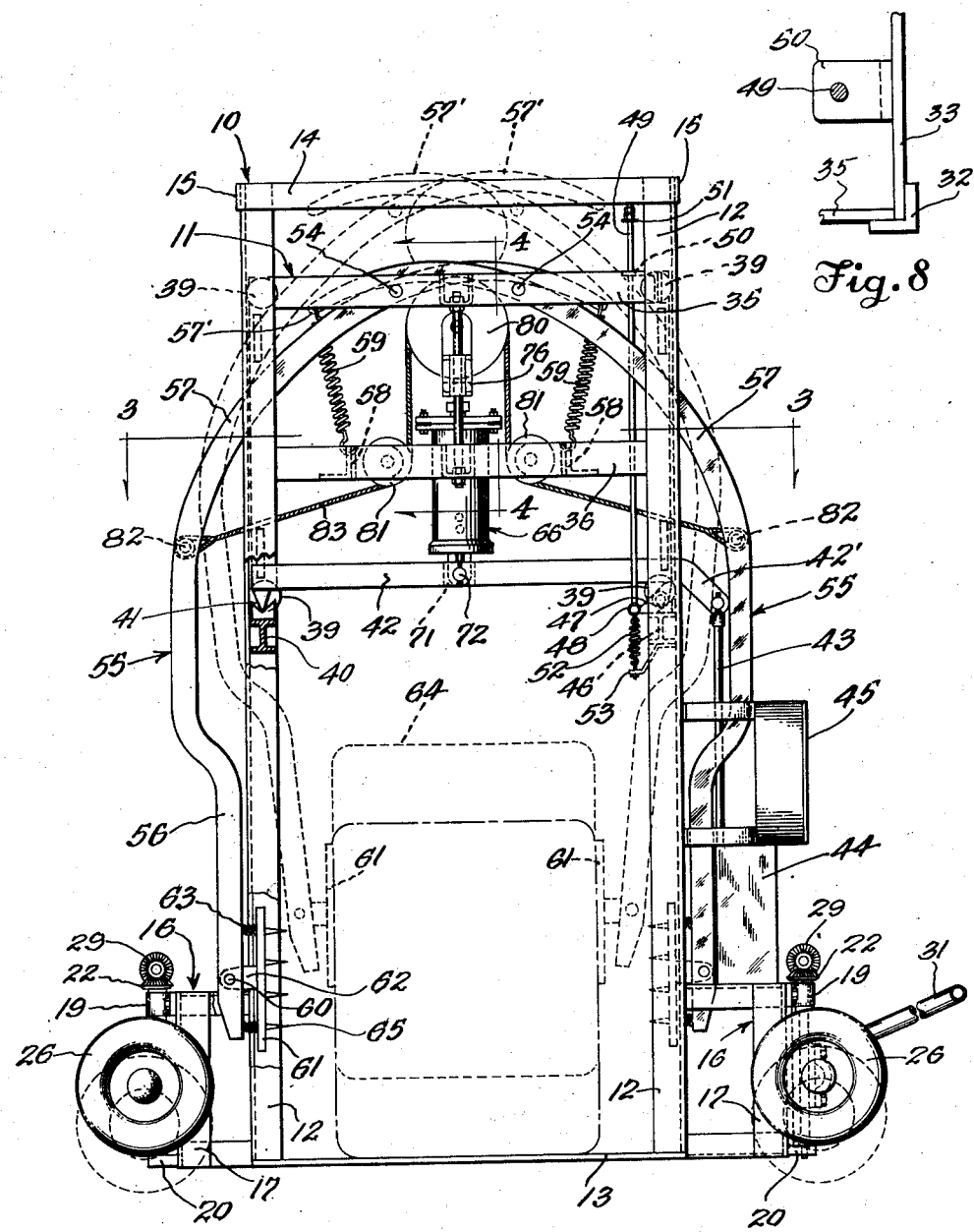
Figure 1 is a view in front elevation of a machine constructed in accordance with the present invention, certain of the parts being shown in dotted outline in shifted position.
Figure 8 is a fragmentary detail showing the guide for the scale beam lock shift rod.

Referring now more particularly to the drawings the numeral 10 generally designates the main frame of the machine while the numeral 11 generally designates the inner or floating frame which is within the confines of the outer frame 10.

The main or outer frame comprises the four upright or corner posts 12 which are mounted in vertical position upon a base or floor plate 13 and which are coupled together at their top ends by the horizontal front and rear rails 14 and side rails 15.

The corner posts 12 are preferably of L-shaped cross section so that the inner frame, which is also constructed preferably of L-shaped or angle iron material, has its vertical corners within the confines of the corners of the posts 12 and the webs of the corner posts 12 function as tracks upon the inner surfaces of which the hereinafter described wheels for the floating frame 11, run.

At the bottom of the main frame 10 and at each side thereof there are provided the laterally extending wheel supports, each of which is generally designated 16. Each of these wheel supports includes vertical corner posts 17 and a transverse bar 18 connecting the upper ends of the posts.

Supported in suitable bearings 19 and 20 in front of each of the vertical posts 17, is a screw 21 upon the upper end of which is secured a miter gear 22. Each of these screws passes through and is in threaded connection with a runner block 23 which supports a yoke 24 which supports the transverse wheel axle 25. Upon each end of the axle 25 is the ground engaging wheel 26.

Supported transversely of each side of the frame for rotation on a horizontal axis in bearings 27, is a crank shaft 28. This shaft carries and has secured thereto the miter gears 29, each of which is in toothed connection with the gear 22 and one end of the shaft 26 carries a hand crank 30.

It will be seen from the foregoing that by the manipulation of the shafts 28, the screws 21 may be turned to raise and lower the runner block 23 and accordingly bring the wheels 26 into contact with the ground so as to elevate the machine or raise the wheels so as to lower the machine into working position.

In order that the machine may be conveniently moved when the wheels 26 have been moved downwardly so as to lift the machine from the ground, one of the axles 25 is provided with the steering tongue 31.

The movable or shiftable frame 11 comprises the vertical corner posts 32 which, as previously stated, are preferably formed of angle iron material, the upper and lower side bars 33 and 34 respectively and the upper and lower, front and rear horizontal rails or bars 35, 36, 37 and 38. Thus the inner frame is in a form of a skeletal box.

The vertical posts 32 of the inner frame carry, upon the outer side of such frame, the rollers 39, certain of which are supported on horizontal axes extending from front to rear of the frame 11 and the others being supported upon horizontal axes extending transversely of the frame 11 and these rollers have peripheral contact with the inner sides of the web of the vertical post of the stationary frame 10 as shown in Figure 3. Thus the inner frame 11 is movable freely inside the outside or main frame, with a minimum of friction.

Extending from front to rear between two of the posts 12 of the main frame is a supporting beam 40 upon which is mounted a knife or scale bearing, generally designated 41, for one end of a scale beam or steelyard 42. This scale beam 42 lies in a vertical plane lying centrally between the front and rear posts 12 of the main frame and, as shown in Figure 1, it extends beyond the opposite side of the machine and terminates in the downturned portion 42', which downturned terminal portion is connected with the rod 43 which extends downwardly into the housing 44 in which are located scale reducing levers of known construction, with which the rod or coupling link 43 is connected. Above the box 44 is an indicating dial 45 which, as shown in Figure 2, is provided with a pointer 46 for indicating the amount of weight carried by the scale beam 42 when the machine is in operation.

No detailed illustration or description of the scale mechanism enclosed in the box and dial casing 44 and 45 is given or is believed necessary since such mechanism is of standard construction and in itself comprises no part of the present invention.

Upon the opposite side of the machine from the knife bearing unit 41, is a beam 46 extending from front to rear between the posts 12 and upon which is mounted for oscillation on a horizontal axis extending transversely of and beneath the scale beam 42, a rockable lock member 47 of the type commonly employed in connection with scales of the platform type to secure the scale beam 42 against vertical oscillation, when desired.

The scale beam lock member 47 has pivotally attached thereto, at 48, one end of a vertical shift rod 49 which extends upwardly through the shiftable frame 11 and through a combined guide and trip plate 50 as shown in Figure 1. The upper end of the rod 49 carries a collar 51 with which the combined guide and trip 50 engages when the shiftable frame 11 has moved upwardly in the main frame to a predetermined extent, to cause the rod 49 to be pulled upwardly and release the scale beam lock 47.

The upward movement of the rod 49 is opposed by a spring 52, here shown as being connected with the lower end of the rod at the pivot 48 and with a bracket 53 carried by the beam 46. It will be readily apparent that this spring functions, upon the downward movement of the frame 11, to move the scale beam lock 47 back into beam locking position so that oscillation of the scale beam is prevented at all times except when a body is actually being weighed.

Extending across between the upper front and rear horizontal rails 35 and 37 of the vertically movable frame 11 are the two lifting arms supporting shafts 54. These shafts are in spaced parallel relation and are upon opposite sides of the vertical center of the machine.

Each shaft 54 has oscillatably supported therefrom two lifting arms, each of which is generally designated 55. Each of the arms 55 comprises a long lower end portion 56 and an upwardly and inwardly curving upper end portion 57 which connects with a shaft 54. As is clearly illustrated in Figure 1 the upper end portion 57 of each arm does not terminate at the shaft 54 but extends across in a continuing downwardly curving terminal portion 57' which terminal portion extends beyond the shaft 54 to which the arm is attached. Thus it will be seen that the extensions 57' of the arms on one side of the machine are in crossed relation with the extended terminal portions 57' of the arms on the opposite side of the machine.

The lower front and rear bars 36 and 38 of the movable frame 11 have extending therebetween the spaced parallel connecting bars 58. These bars are disposed upon opposite sides of the vertical center of the machine and, as shown in Figure 1, are spaced apart a slightly greater distance than the shafts 54.

Connected between the end of each arm extension 57' and the adjacent underlying bar 58 is a spring 59 which is constantly under tension and exerting a downward pull upon the end 57' of the arm thereby tending to oscillate the arm so that the lower end of the portion 56 thereof will swing outwardly or laterally away from the center of the machine.

At the lower ends of the portions 56 of each pair of arms there is supported, between the arms, the gripper plate axle 60 and upon the inner side of such axle is located a gripper plate 61. The gripper plate has a pair of hinge ears 62 through which the axle 60 passes, whereby the plate has limited oscillation on the axle. This oscillation is yieldingly opposed, however, by spring members 63 interposed between the back of each plate and the adjacent arm portion 56 as shown in Figure 1, whereby the plates are normally maintained vertical when the arms are in idle position. However, as the arms swing inwardly to grip between the opposed plates 61, a body such, as for example, as a bale of cotton, shown in broken outline and indicated by the numeral 64, the plates may maintain a parallel relation when the lower ends of the arms are angled downwardly and inwardly as shown in broken outline in Figure 1.

In order that a positive grip may be obtained between the plates 61 and the body 64, the inner faces of the plates are provided with suitable pins or teeth 65 which are of moderate length and are tapered or pointed so as to cause no damage to the engaged body.

At the vertical center of the machine, above the scale beam 42, there is disposed the power unit which is generally designated 66. This power unit is supported entirely upon the scale beam 42 and through the power unit the scale beam also entirely supports the movable frame 11 and the lifting arms carried thereby.

The power unit comprises a vertically disposed piston cylinder 67 having a bottom head plate 68 and a top head plate 69. The bottom head plate 68 has formed integral therewith and upon the axial center of the cylinder, the apertured foot 70 which extends into a slot 71 formed in the scale beam 42. Extending transversely through the scale beam and through the slot 71 is a pin 72 which also extends through the apertured foot 70, thereby supporting the cylinder on the beam.

Within the cylinder 67 is the piston 73 with which is connected the piston rod 74 which passes upwardly through the packing gland 75 forming a part of the upper head plate 69. At its upper end the piston rod 74 is connected with a cross head 76 which is horizontally disposed and extends from front to rear and has at each end the vertical guide sleeve 77.

Supported vertically in spaced parallel relation at opposite sides of the power unit 66 are the guide rods 78, each of which passes through a guide sleeve 77 of the cross head 76. Thus the upper end of the piston rod is maintained against movement from the axial center of the piston cylinder.

Also forming a part of the cross head 76 is a yoke 79 in which is rotatably mounted a pulley wheel 80. This wheel is supported for turning on an axis extending in a direction from the front to the rear of the machine and thus the pulley wheel is maintained in a plane extending transversely of the machine and upon the center thereof as shown in Figures 2 and 4.

At each side of the power unit cylinder 67 and in the vertical plane of the pulley wheel 80, there is rotatably supported upon each beam 58, a smaller pulley wheel 81 which rotates on an axis extending in a direction horizontally from the front to the rear of the machine as is readily seen in Figures 1 and 3.

Each pair of arms 55 has connecting therebetween and in a plane above the scale beam 42, the pull bar 82. Secured to the central part of each pull bar 82 is one end of a lift cable 83. This cable 83 passes from one bar 82 inwardly across the inner side of the adjacent pulley 81 then upwardly to and over the top of the upper pulley 80 and down across the inner side of the other pulley 81 and outwardly to the other pull bar 82 as is readily seen in Figure 1. Thus it will be seen that any upward movement of the pulley 80 under the action of the piston 73 will elongate vertically the cable loop formed between the pulleys 80 and 81 and thus pull inwardly on the arms 55 causing the lower ends thereof to move together by rocking the arms on the shafts 54.

The power unit 66 is designed to be operated by compressed air or other suitable fluid. Since the upper end of the cylinder 67 is closed by the head 69 there is provided a pressure exhaust valve 84 and an intake valve 85. The bottom head 68 has leading therethrough the fluid admission pipe line 86 and the exhaust pipe line 87 and in each of these pipes is an adjustable orifice valve 88.

In advance of the valve 88 in the admission line 86 there is connected with this line, the shunt line 89 having the two outlets 90 which open through the wall of the cylinder 67 at longitudinally spaced points as shown in Figure 5 and each of these outlets has an adjustable orifice valve 91 therein.

Connected in the operating fluid supply pipe line 86 ahead of the shunt take off 89 is a control valve 92 and a corresponding valve 93 is connected in the exhaust line 87 ahead of the adjustable valve 88.

The fluid admission control valve 92 has a control stem 94 which is attached to a flexible diaphragm 95 which forms a wall of a pulsator housing 96 into which leads a tube or fluid line 97.

The exhaust control valve 93 also has a valve stem which is designated 98 and this stem is connected with the flexible diaphragm 99 which forms one wall of a pulsator housing 100. Leading into this pulsator housing is a tube or fluid line 101.

The numerals 102 and 103 designate two diaphragm pump units to each of which is connected one of the fluid lines leading from a pulsator. Each of these diaphragm pumps includes a flexible diaphragm, one only of which is here illustrated, the same being shown in Figure 5 in connection with the pump 102 and being designated 102'.

The diaphragm pumps 102 and 103 are enclosed in a housing 104 and each of the pumps includes a diaphragm stem 105, one only of which is shown, which extends through the inclined top 104' of the box or housing and is connected with the underside of a pivoted treadle 106 which overlies the inclined top wall or surface 104' of the housing and is pivotally attached thereto at the lower or bottom edge as indicated at 107. Thus it will be seen that upon depressing either of the two treadles 106 the diaphragm of the underlying pump will be forced inwardly and since each pump, pulsator and tube connecting therebetween forms a closed fluid tight system such inward pressure of the pump diaphragm will transmit pressure to the diaphragm of the pulsator and thus actuate the stem of the control valve associated therewith. Since the control valves 92 and 93 are normally closed it will be seen that the operation of either diaphragm pump will open the associate control valve. Also each of the diaphragm pumps has associated therewith a spring, such, for example, as the spring 108, shown in Figure 5, which normally urges movement of the diaphragm outwardly so that when pressure is relieved from the treadle the pump diaphragm will return to normal position and thus allow the associate control valve stem to be shifted in a direction to close the control valve.

As shown in Figure 6 means is provided whereby one treadle will be held in depressed position when the other treadle is raised so that the control valve associated with the depressed treadle will be maintained open but when the raised treadle is depressed, such depression will effect the release of the previously depressed treadle and the newly depressed treadle will become locked or secured in depressed position.

The control mechanism for the treadles comprises a pivot pin or stud 109 upon which are oscillatably supported the rock rods 110. As shown each of these rods has a long end and a short end and the long end of each extends beyond the short end of the other rod and each of these remotely related ends carries the upwardly extending release pin 111 which passes through the top 104' of the housing 104 and to the underside of a treadle 106.

Pivotally mounted within the housing 104 beneath each treadle 106, as at 112, is the upwardly extending latching hook 113 which projects through the top wall 104' of the housing and is positioned so as to be engageable across the longitudinal edge of the adjacent treadle when desired to hold the treadle down.

At its pivoted inner end, each treadle hook 113 is connected with an angularly extending foot 114 upon which bears an end of an overlying spring 114', the other end of which spring presses against the underside of the top wall 104' of the housing. These springs 114' are under tension and normally urge the oscillation of the hook 113 in a direction to engage the adjacent treadle.

Each of the foot members 114 is disposed directly above the upturned end or tip 115 of the short end of a rod 110 so that when the rod 110 is rocked by the application of downward pressure to the thrust pin 111 which is pivotally connected with its other and longer end, the upturned finger at its opposite end will press upwardly on the overlying foot member of the opposite treadle hook 113 so as to oscillate the hook in the direction to release the treadle which is adjacent thereto. Release of the treadle permits it to be pushed up by the spring pressed pin 105 of the underlying diaphragm pump thereby shifting it away from the underlying pin 111 and consequently the spring 114' of the opposite or depressed treadle will move the adjacent hook 113 into treadle locking position. The action of this spring 114' pushing down upon the short end of the rod 110 associated with the released treadle will also function to kick the released treadle upwardly.

From the foregoing it will be readily apparent that the housing 104 in which the diaphragm pumps are contained, may, because of the flexible hose line connections 97 and 101 with the pulsators 96 and 100, be disposed in any suitable position on the floor upon which the weighing machine is supported. Thus an attendant upon the weighing machine may place the housing 104 in a position where, while seated at a table or otherwise suitably positioned, he may watch the weight indicating dial 45 and he may control the treadles 106 to effect the grasping and raising and the lowering and releasing of loads placed in position between the gripper plates 61.

By reason of the fact that the bottom plate 13 of the machine rests directly upon the ground or the floor when the machine is in use, it will be readily seen that a bale of cotton or any other body to be weighed can be moved by suitable trucks into position upon the base plate 13 whereupon the operator having control of the treadles 106 can, by depressing the treadle which operates the diaphragm pump controlling the pulsator 96, cause the fluid to be introduced into the cylinder 67 beneath the piston 73 to effect the gripping and raising of the load. It is needless to explain when such treadle is depressed the opposite or release treadle will be automatically freed so that the exhaust control valve 93 will be closed.

As the pressure fluid passes through the pipe line 86 into the lower end of the cylinder 67 the piston will force the pulley 80 upwardly and the gripper plates 61 will be swung inwardly by the arms 55 so as to grasp the load between them. After the load is so grasped between the lower ends of the arms the continued upward movement of the power unit piston will cause upward movement of the entire frame 11, the arms 55 and the load, the entire weight of this upwardly moving structure being carried by the immovably held scale beam 42. As soon, however, as the frame 11 moves upwardly to the position where the lock actuator rod 49 is engaged and tripped by the guide 50, the scale beam 42 will be unlocked by the shifting of the lock member 47 and consequently the end portion 42' of the scale beam will move down under the load which it carries and the weight of such load will be shown upon the scale dial 45.

The operator then depresses the other treadle which controls the diaphragm pump which in turn actuates the pulsator controlling the exhaust valve 93 whereupon the fluid admission valve 92 will be closed and the exhaust valve 93 will be opened, permitting the piston to come down to lower the load to its initial position upon the truck or upon the base plate 13. The arms 55 will then be released, by the springs 59, from the load and the machine is ready to receive a new load.

As will be readily apparent the releasing operation of the arms from the load is effected by the springs 59, as a result of the placing of these springs under increased tension when the arms were swung inwardly for gripping the load to be weighed. Since the springs are connected with the extensions 57' which continue beyond the pivot shafts 54 for the arms, it will be readily apparent that as the arms are swung inwardly these extensions are swung upwardly away from the underlying beams 58 with which the springs 59 are connected, thereby further stretching or tensioning the springs. When the arms come down and the pulley 80 is lowered by the return of the piston 73 into the lower end of the cylinder 67, the springs 59 react by pulling downwardly upon the extensions 57' thereby causing the lower ends of the arms 55, to swing outwardly and release the load.

By the provision of the vertically spaced auxiliary inlets 90 leading from the fluid supply line 86 it will be readily seen that after the initial movement of the piston to actuate the inwardly swinging arms 55, it will pass the auxiliary ports 90 so that additional fluid can be introduced automatically to accelerate the lifting action.

The valves 92 and 93 are of the conventional spring closed type known as "whistle type." These valves, as shown, include the springs 92' and 93' which automatically close the respective valves 92 or 93 when the pressure upon the valve stem is removed. Thus when the diaphragm pumps are in released or raised position the springs will function to close the valves.

Reference has been made to exhaust and intake valves 84 and 85 and the function of these valves is as follows. When the piston 73 goes down air is drawn in through intake valve 85. When such piston is moving up on its power stroke the air in the cylinder is compressed above the piston, which causes the piston to be checked in its travel and cushioned to an easy stop. The speed of the stop is controlled by adjusting the exhaust valve 84, to thus control the speed of escape of air from the cylinder.

I claim:

1. A weighing mechanism of the character described, comprising a first frame structure formed to provide a vertical guide, a second frame disposed within the guide for vertical movement, a scale beam supported for vertical oscillation upon the first frame beneath the second frame, weight indicating mechanism operatively coupled with the scale beam for actuation by and upon movement of the beam, a power unit supported upon the beam and including a vertically movable element, an operative coupling between the vertically movable element and the second frame whereby the second frame is raised by the power unit, and means carried by the second frame for supporting therefrom a body to be weighed.

2. A weighing mechanism of the character stated in claim 1, in which the said means for supporting a body from the second frame to be weighed comprises a pair of arms pivotally mounted upon the second frame to swing toward and away from one another, and an operative coupling between the power unit and the arms for effecting the swinging together of the arms at the beginning of the operation of the power unit.

3. Weighing apparatus of the character described, comprising a structure forming a vertical guide, a second structure disposed within said guide for vertical movement, weight computing mechanism carried by the guide structure and including a vertically oscillatable scale beam, a power unit including a piston cylinder, a piston in the cylinder and a piston rod extending from an end of the cylinder, said cylinder being mounted upon the scale beam and said rod being movable upwardly therefrom, means coupling said piston rod with the vertically movable structure whereby the latter is shifted upwardly upon outward movement of the piston rod, and means for suspending a body from the vertically movable structure to be lifted thereby upon outward movement of the piston rod.

4. A mechanism of the character stated in claim 3, in which the means for suspending a body carried by the vertically movable structure comprises arms pivotally supported upon the second mentioned structure to be swung together to grip between them a body to be raised, means normally urging the arms apart, and means operatively coupling the arms with the piston rod for effecting the movement of the arms together upon outward movement of the piston rod.

5. A weighing mechanism of the character described, comprising a structure formed to provide a vertical guide, a frame supported within said guide for vertical movement, a weight computing mechanism including a scale beam supported upon the guide structure for vertical oscillation, a power unit supported upon the scale beam and including a vertically movable member, means operatively coupling the vertically movable member with the frame for effecting the vertical movement of the frame upon movement of said member upwardly, means carried by the frame for suspending therefrom a body to be weighed, means for locking the scale beam against oscillation, and means operating automatically to release the scale beam locking means upon the movement of said frame upwardly to a predetermined extent.

6. Weighing mechanism of the character stated in claim 5, with means for actuating the locking means upon return movement of the frame downwardly.

7. Weighing mechanism of the character described, comprising a structure formed to provide a vertical guide, a vertically movable structure confined within said guide for limited vertical movement, a weight computing mechanism including a scale beam supported upon the guide structure for vertical oscillation below the vertically movable structure, a power unit supported entirely upon the scale beam and including an upwardly movable element, arm members pivotally supported upon the vertically movable structure and extending downwardly therefrom, the arms being adapted to move toward one another to grip between them a body to be raised and weighed, an operative coupling between said upwardly movable element of the power unit, the vertically movable structure and the arms and adapted upon operation of the power unit to first move the arms together to grip a body and then move the arms and vertically movable structure upwardly, and means for effecting the separatory movement of the arms for the release of the body upon reverse operation of the power unit for the lowering of the vertically movable structure in the guide.

8. Weighing mechanism of the character stated in claim 7, including means for locking the scale beam against oscillation during such time as the vertically movable structure is below a predetermined elevation, and means for releasing the scale beam locking means upon movement of the vertically movable structure to said predetermined elevation.

9. Weighing mechanism of the character stated, comprising a structure formed to provide a vertical guide, a vertically movable structure disposed within the guide, weight computing mechanism including a scale beam supported upon the guide structure for vertical oscillation, said beam being disposed beneath the vertically movable structure, a pair of relatively long arms extending vertically at opposite sides of the structures, each of said arms curving upwardly and inwardly at its upper end, a pivotal coupling between the upper end of each arm and the vertically movable structure by which the lower ends of the arms may swing inwardly and outwardly, means normally urging the arms to swing outwardly at their lower ends, a power unit supported upon said scale beam and including a vertically movable element, guide elements carried by the vertically movable structure at opposite sides of the power unit, and a flexible connection between the arms and the vertically movable element of the power unit, the flexible connection passing beneath the guide elements whereby upon vertical movement of the power unit element the arms will be swung together and the arms and vertically movable structure will be moved upwardly.

10. Weighing mechanism of the character described, comprising a structure formed to provide a vertical guide, a vertically movable structure within the guide, weight computing mechanism including a scale beam supported upon the guide structure beneath the vertically movable structure, for vertical oscillation, a power unit supported entirely upon the scale beam, means operatively coupling the power unit with the vertically movable structure for effecting the upward movement of the vertically movable structure, means connected with the vertically movable structure to be raised thereby for suspending therefrom a body to be weighed, an oscillatable lock element adapted when in locking position to enfold the scale beam against vertical oscillation, yieldable means normally urging the lock element to be in locking position, said lock element securing the scale beam against oscillation at all times that the vertically movable structure is below a predetermined elevation, and means operating automatically upon movement of the vertically movable structure to the said predetermined elevation for releasing the scale beam locking element.

11. Weighing mechanism of the character described, comprising a vertical frame structure having inwardly facing angle corner posts forming a vertical guide, a rectangular frame within said guide, roller elements carried by the frame and engaging the inner sides of the angle members to facilitate smooth vertical movement of the frame, a weighing scale including a scale beam supported beneath said frame upon said vertical structure for vertical oscillatory movement, a base plate upon which said corner posts are mounted, a power unit supported solely on said scale beam and having a vertically movable element, relatively long arms extending longitudinally of the vertical frame at opposite sides thereof and each curving inwardly at its upper end and extending into the vertically movable frame, pivotal means between the upper ends of the arms and the vertically movable frame, and means coupling the vertically movable element of the power unit with the arms and with the vertically movable frame to effect upward movement of the vertically movable frame and arms upon upward movement of said power unit element and to effect the movement of the lower ends of the arms together to grip a body to be weighed.

12. Weighing mechanism of the character described, comprising a vertical rectangular frame structure including corner guide posts, a movable rectangular frame within said frame structure and having sliding connection with said guide posts for vertical movement, a scale beam supported on the frame structure for vertical oscillation beneath the movable frame, a power unit supported upon the scale beam and including an upwardly extending vertically movable piston rod extending into the movable frame, a pulley member supported upon the upper end of the piston rod, a pair of relatively long arms extending longitudinally of the frame structure at opposite sides thereof and each including an inwardly and upwardly curving upper end portion extending into the movable frame, a pivotal connection between the upper end portions of the arms and the movable frame by which the lower ends of the arms are adapted to swing inwardly and outwardly, said arms at their upper end having arcuate extensions in crossed relation, spring members connecting said extensions with an underlying portion of the movable frame and normally urging said lower ends of the arms apart, a pair of guide members supported upon the movable frame at an elevation below said pulley and at opposite sides of the power unit system, and a cable connected at each of its ends with an arm and passing inwardly across the lower and inner sides of said guide members and over the top of said pulley.

PERRY D. HUDSON.

REFERENCES CITED

The following references are of record in the file of this patent:

UNITED STATES PATENTS

| Number | Name | Date |
|---|---|---|
| 1,549,159 | Suhm | Aug. 11, 1925 |
| 1,897,171 | Lewis | Feb. 14, 1933 |
| 1,984,606 | Thomas | Dec. 18, 1934 |
| 2,045,445 | Davis | June 23, 1936 |
| 2,152,247 | Endacott | Mar. 28, 1939 |
| 2,207,053 | Fivecoate et al. | July 9, 1940 |
| 2,373,469 | Grime | Apr. 10, 1945 |

FOREIGN PATENTS

| Number | Country | Date |
|---|---|---|
| 562,388 | France | Sept. 1, 1923 |